(12) United States Patent
Hutton et al.

(10) Patent No.: US 7,913,067 B2
(45) Date of Patent: Mar. 22, 2011

(54) METHOD AND SYSTEM FOR OVERLAPPING EXECUTION OF INSTRUCTIONS THROUGH NON-UNIFORM EXECUTION PIPELINES IN AN IN-ORDER PROCESSOR

(75) Inventors: David S. Hutton, Tallahassee, FL (US); Khary J. Alexander, Poughkeepsie, NY (US); Fadi Y. Busaba, Poughkeepsie, NY (US); Bruce C. Giamei, Poughkeepsie, NY (US); John G. Rell, Jr., Saugerties, NY (US); Eric M. Schwarz, Gardiner, NY (US); Chung-Lung Kevin Shum, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 443 days.

(21) Appl. No.: 12/034,084

(22) Filed: Feb. 20, 2008

(65) Prior Publication Data

US 2009/0210656 A1    Aug. 20, 2009

(51) Int. Cl.
*G06F 9/38* (2006.01)
(52) U.S. Cl. .......................... 712/220; 712/222
(58) Field of Classification Search .................. None
See application file for complete search history.

(56) References Cited

U.S. PATENT DOCUMENTS

| | | | | |
|---|---|---|---|---|
| 5,293,613 A * | 3/1994 | Hayden et al. | ................ | 714/15 |
| 5,410,657 A * | 4/1995 | Olson et al. | .................... | 712/215 |
| 5,559,977 A * | 9/1996 | Avnon et al. | ................... | 712/244 |
| 5,826,070 A * | 10/1998 | Olson et al. | ................... | 712/222 |
| 5,867,683 A | 2/1999 | Witt et al. | | |
| 5,867,684 A * | 2/1999 | Kahle et al. | .................... | 712/218 |
| 6,021,488 A | 2/2000 | Eisen et al. | | |
| 6,032,249 A * | 2/2000 | Olson et al. | .................... | 712/200 |
| 6,035,389 A * | 3/2000 | Grochowski et al. | ......... | 712/216 |
| 6,041,167 A * | 3/2000 | Song | ............................ | 712/214 |
| 6,289,437 B1 | 9/2001 | Eisen et al. | | |
| 6,772,327 B2 * | 8/2004 | Biswas et al. | ................. | 712/245 |
| 6,785,701 B2 * | 8/2004 | Park et al. | ..................... | 708/505 |
| 6,826,682 B1 * | 11/2004 | Rozas et al. | ................... | 712/244 |
| 6,907,518 B1 | 6/2005 | Lohman et al. | | |
| 6,944,718 B2 * | 9/2005 | Jouppi et al. | .................. | 711/137 |
| 7,200,742 B2 | 4/2007 | Busaba et al. | | |

(Continued)

OTHER PUBLICATIONS z/Architecture, Principles of Operation, Sixth Edition, Apr. 2007, Publication No. SA22-7832-05, copyright IBM Corp. 1990-2007, pp. 1-1218.

*Primary Examiner* — Eric Coleman
(74) *Attorney, Agent, or Firm* — Cantor Colburn LLP; John Campbell (57) ABSTRACT

A system and method for overlapping execution (OE) of instructions through non-uniform execution pipelines in an in-order processor are provided. The system includes a first execution unit to perform instruction execution in a first execution pipeline. The system also includes a second execution unit to perform instruction execution in a second execution pipeline, where the second execution pipeline includes a greater number of stages than the first execution pipeline. The system further includes an instruction dispatch unit (IDU), the IDU including OE registers and logic for dispatching an OE-capable instruction to the first execution unit such that the instruction completes execution prior to completing execution of a previously dispatched instruction to the second execution unit. The system additionally includes a latch to hold a result of the execution of the OE-capable instruction until after the second execution unit completes the execution of the previously dispatched instruction.

22 Claims, 5 Drawing Sheets

U.S. PATENT DOCUMENTS

| | | | |
|---|---|---|---|
| 7,373,548 B2 * | 5/2008 | Reinhardt et al. | 714/13 |
| 2004/0103268 A1 * | 5/2004 | Paulraj | 712/227 |
| 2004/0215933 A1 * | 10/2004 | Nguyen et al. | 712/200 |
| 2005/0228972 A1 * | 10/2005 | Eisen et al. | 712/218 |
| 2006/0179286 A1 | 8/2006 | Haess et al. | |
| 2006/0236195 A1 | 10/2006 | Novichkov et al. | |

* cited by examiner

METHOD AND SYSTEM FOR OVERLAPPING EXECUTION OF INSTRUCTIONS THROUGH NON-UNIFORM EXECUTION PIPELINES IN AN IN-ORDER PROCESSOR

BACKGROUND OF THE INVENTION

This invention relates generally to limited out-of-order execution in an in-order processor, and more particularly to allowing instructions in a shorter execution pipeline to complete execution before older instructions complete execution in a longer execution pipeline in an in-order processor.

For traditional in-order microprocessors (io-µPs), instructions are fetched, dispatched, executed, and retired in a sequential order. Some µPs, including io-µPs, employ instruction pipelining to increase throughput. Individual units that support execution of instructions in micro-architecture of a µP (e.g., fixed-point execution unit (FXU), branch resolution unit (BRU), floating point unit (FPU), etc.) can have different pipeline lengths at the unit level, or not support pipelining at all. Pipelining can increase throughput when sequential instructions are executed that keep the pipeline full, such that operands are ready for each instruction in the execution stage of the pipeline. However, if an FPU-pipelinable instruction is in flight, a subsequent FXU instruction (for example, a branch) must stall at dispatch as long as necessary to ensure in-order completion/retirement. This in turn disrupts the FPU's pipelined execution as subsequent FPU-pipelinable instructions behind the FXU instruction are now stalled prior to dispatch as well. Io-µPs can incur performance degradation when floating-point and fixed-point instructions are both present in an instruction stream, as floating-point instructions take much longer than fixed-point instructions to complete, due in part to a greater number of pipeline stages for floating-point instructions. Typical examples include floating-point instructions within a branch loop, where a branching instruction is executed in either a BRU or a FXU. In this case, the io-µP's pipelined FPU must stop and wait for the BRU or FXU to resolve the branch before resuming pipelined FPU operation.

In out-of-order microprocessors (ooo-µPs), instructions can be fetched, dispatched, executed, and retired in an order different from the sequence in which the instructions are stored. The ooo-µPs queue instructions to wait for operands to be available prior to execution, queuing results, and re-ordering the results upon retiring the instructions. The ooo-µPs often use instruction identifiers or register renaming to support out-of-order execution, which require complex circuitry to manage. Register renaming may also require many additional physical registers, so multiple versions of a register can exist at the same time to avoid false operand dependency. The additional complexity of ooo-µPs over io-µPs may increase instruction execution throughput, but leads to higher manufacturing costs and a greater number of failure modes. Moreover, predictability of instruction dispatching, execution, and retiring order in ooo-µPs can be challenging, which further complicates system analysis and debugging.

It would be desirable to perform limited out-of-order execution in an io-µP. Capitalizing on the sizable depth of a FPU pipeline by allowing certain fixed-point instructions to complete execution before older floating-point instructions would increase io-µP throughput without the high level of complexity involved in an ooo-µP. Moreover, this approach could be applied to other instructions with non-uniform execution pipelines. Accordingly, there is a need in the art for an approach to perform overlapping execution of instructions through non-uniform execution pipelines in an io-µP.

BRIEF SUMMARY OF THE INVENTION

An exemplary embodiment includes system for overlapping execution (OE) of instructions through non-uniform execution pipelines in an in-order processor. The system includes a first execution unit to perform instruction execution in a first execution pipeline. The system also includes a second execution unit to perform instruction execution in a second execution pipeline, where the second execution pipeline includes a greater number of stages than the first execution pipeline. The system further includes an instruction dispatch unit (IDU), the IDU including OE registers and logic for dispatching an OE-capable instruction to the first execution unit such that the instruction completes execution prior to completing execution of a previously dispatched instruction to the second execution unit. The system additionally includes a latch to hold a result of the execution of the OE-capable instruction until after the second execution unit completes the execution of the previously dispatched instruction.

Another exemplary embodiment includes a method for overlapping instruction execution in an in-order processor. The method includes detecting a group of overlapping execution (OE)-capable instructions following a pipelineable instruction in the in-order processor, where the group of OE-capable instructions includes one or more instructions. The method also includes dispatching the pipelineable instruction for execution. The method further includes dispatching the group of OE-capable instructions for execution such that execution of the group of OE-capable instructions completes before execution of the pipelineable instruction completes. The method additionally includes retiring the group of OE-capable instructions after retirement of the pipelineable instruction.

A further exemplary embodiment includes a system for overlapping fixed-point and floating-point instruction execution in an in-order processor. The system includes a fixed-point execution unit (FXU) to perform fixed-point instruction execution, including branch instructions. The system also includes a floating-point execution unit (FPU) to perform floating-point instruction execution, where the FPU includes multiple stages. The system further includes an instruction dispatch unit (IDU), the IDU including overlapping execution registers and logic for dispatching a fixed-point instruction to the FXU such that the fixed-point instruction completes execution prior to completing execution of a previously dispatched floating-point instruction. The system additionally includes a latch to hold a result of the execution of the fixed-point instruction until after the FPU completes the execution of the previously dispatched floating-point instruction.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

An exemplary embodiment of the present invention provides overlapping execution of instructions through non-uniform execution pipelines in an in-order microprocessor (io-μP). The io-uP can include one or more fixed-point execution units (FXUs), branch resolution units (BRUs), and floating point units (FPUs), among other units. In an exemplary embodiment, an FPU in the io-uP includes multiple pipelined stages, while fixed-point instructions in a BRU or FXU use a single stage. Thus, non-uniform execution pipelines exist with the FPU having a longer execution pipeline, and the BRU or FXU having a shorter execution pipeline. An instruction can transition through stages of: fetching, dispatching, execution, and retirement. Fetching acquires an instruction from memory, such as an instruction cache. Dispatching controls when the instruction is sent to an execution unit. Execution can be performed in different units depending upon the type of instruction, e.g., fixed point versus floating point. The instruction can complete execution in one cycle or in multiple cycles, again depending upon the instruction type. Upon execution completion, put away may be performed to update certain registers. The instruction is retired at the end of an operation, making any final changes to the state of the io-uP and performing instruction checkpointing to capture a known good state of the io-uP. The io-uP achieves limited out-of-order execution by allowing only one group of out-of-order (ooo) instructions in flight at any one time and uses counters, rather than instruction identifiers (IDs) or register renaming, to ensure in-order retirement of the ooo instructions. Thus, the FPU can continue pipelined operation in its longer execution pipeline while allowing the BRU and/or FXU to resolve a small quantity of fixed-point instructions in shorter execution pipelines. This approach does not require usage or management of instruction IDs or register renaming techniques that are commonly used in out-of-order processor (ooo-uP) design. Instruction dispatching is performed in-order, but execution may occur out-of-order between the older FPU and younger BRU and/or FXU instructions given the longer FPU execution duration. Therefore, the process described in greater detail herein is also referred to as overlapped execution (OE), with instruction dispatch and retirement remaining in-order.

Figure 1:
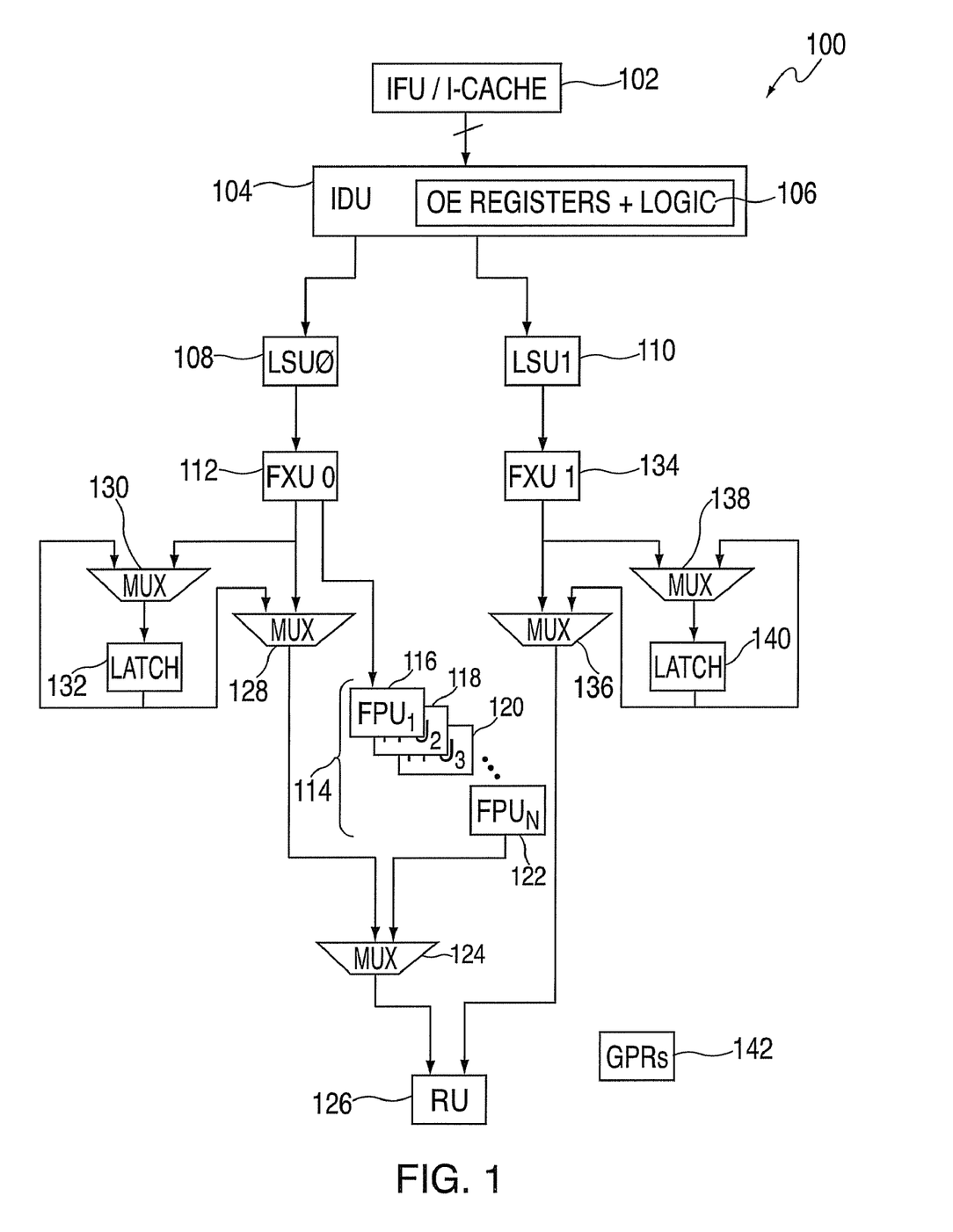
FIG. 1 depicts a block diagram of a system in an in-order microprocessor upon which overlapping execution of instructions through non-uniform execution pipelines may be performed in exemplary embodiments.

Turning now to the drawings in greater detail, it will be seen that in FIG. 1 a block diagram of a system 100 in an io-μP upon which overlapping execution of instructions through non-uniform execution pipelines may be performed is depicted in accordance with an exemplary embodiment. The system 100 includes an instruction fetching unit/instruction cache (IFU/I-cache) 102 that acquires instructions from memory and passes them to instruction dispatch unit (IDU) 104. In an exemplary embodiment, the IDU 104 includes OE registers and logic 106 that controls timing of instruction execution for increased efficiency. The IDU 104 dispatches both floating-point and fixed-point instructions to load/store unit (LSU) zero 108 and LSU one 110. The LSUs 108 and 110 provide multiple paths for instruction execution and handle storage operand accesses and pretests, e.g., a superscalar architecture. The LSU zero 108 passes instructions to FXU zero 112. The FXU zero 112 passes floating-point instructions to FPU 114, which includes multiple stages for pipelined execution. The floating-point pipeline of FPU 114 can be of any depth with multiple stages. For instance, the floating-point pipeline can include FPU stage one 116, FPU stage two 118, FPU stage three 120, up to FPU stage N 122. In an exemplary embodiment, there are eight FPU stages in the FPU 114. The FPU 114 has a longer execution pipeline relative to the FXU zero 112, resulting in non-uniform execution pipelines. The final stage in the FPU 114, FPU stage N 122, outputs a result to mux 124, which in turn passes the result to recovery unit (RU) 126 to handle instruction result checking. For example, the RU 126 can detect and initiate recovery operations on a failure condition. The mux 124 also receives input from mux 128, which can select between output from the FXU zero 112 or a past value of the FXU zero 112. The past value of the FXU zero 112 is captured and held using mux 130 and latch 132 for checkpointing.

In an exemplary embodiment, a separate processing path to the RU 126 exists between the LSU one 110, FXU one 134, and mux 136. Similar to the mux 128, the mux 136 can pass the output of the FXU one 134 or a past value of FXU one 134 to the RU 126. The past value of FXU one 134 is captured and held using mux 138 and latch 140 for checkpointing. The latches 132 and 140 enable fixed-point instruction execution to occur in the FXUs zero 112 and one 134 while a floating point instruction is still in an early stage of the FPU 114, e.g., FPU stage one 116. Writeback of execution results occurs immediately post-execution so that updated registers (e.g., general program registers (GPRs 142)) are apparent to subsequent instructions as soon as possible. Checkpointing of execution results occurs at completion/retirement, providing a known-good state to recover from should the need arise. Writeback is unaffected by OE, and is a fixed-function of execution timing. However, checkpointing for OE-FXU instructions is delayed, since it is a function of completion/retirement. The latches 132 and 140 hold execution results of the fixed-point instructions so that retirement order can be maintained. Earlier floating-point instruction results reach the RU 126 prior to a subsequent fixed-point instruction even though the subsequent fixed-point instruction execution results are ready prior to the float-point instruction execution results.

In an exemplary embodiment, the FXUs zero 112 and one 134 are capable of resolving branch instructions. In an alternate embodiment, one or more branch resolution units (BRUs) replace either or both of the FXUs zero 112 and one 134. Additionally, one or more BRUs can be placed in parallel with the FXU zero 112 and/or FXU one 134, should the FXU zero 112 and/or FXU one 134 not fully support branch resolution. Thus, references to fixed-point instruction execution described in reference to the FXU zero 112 and/or FXU one 134 are also applicable to one or more BRUs within the scope of the invention.

The OE registers and logic 106 in the IDU 104 initiates OE by examining instructions received from the IFU/I-cache 102. In an exemplary embodiment, a first set of instructions is identified as FPU-pipelinable, and a second set of instructions is identified as OE-capable with respect to the first set of instructions. Limiting the set of instructions that support OE may simplify design considerations. For instance, performing OE for instructions that do not modify or are not sensitive to condition code changes (e.g., simple load, load address and branch instructions) eliminates potential problems that could otherwise occur. Once the IDU 104 dispatches an FPU-pipelinable instruction, the OE registers and logic 106 calculates how many FPU-pipeline cycles remain until it no longer overlaps with the next potential fixed-point instruction. If a group of OE-capable fixed-point instructions (1 or more) is detected, the IDU 104 dispatches the group with an indication to the FXU zero 112 (and possibly to FXU one 134) regarding how many cycles (wait counts) are left until a previous FPU instruction is done executing in the FPU 114. When instructions are sent to both FXUs zero 112 and one 134 in the same cycle, they are grouped. If the group is then followed by another FPU-pipelinable instruction, the IDU 104 continues to dispatch, rather than stalling to ensure in-order execution of the group. In an exemplary embodiment, only one OE group is permitted between FPU-pipelined instructions.

The FXU zero 112 and/or FXU one 134 can execute the overlapped instructions and write all results to working sets of the GPRs 142, resolve branches, and perform other fixed-point operations known in the art. However, the actual retirement of the instructions is held off until a wait counter in the OE registers and logic 106 is decremented to zero. The RU 126 acknowledges actual commitment, and decoding commences (if needed) along any newly resolved branch path. If floating-point instructions ahead of the fixed-point instructions do not complete successfully, the FPU 114 is flushed, the RU 126 restores contents of the GPRs 142 that are deemed prematurely written, and the IFU/I-cache 102 restores its fetching path from the last committed point of the instruction stream.

Figure 2:
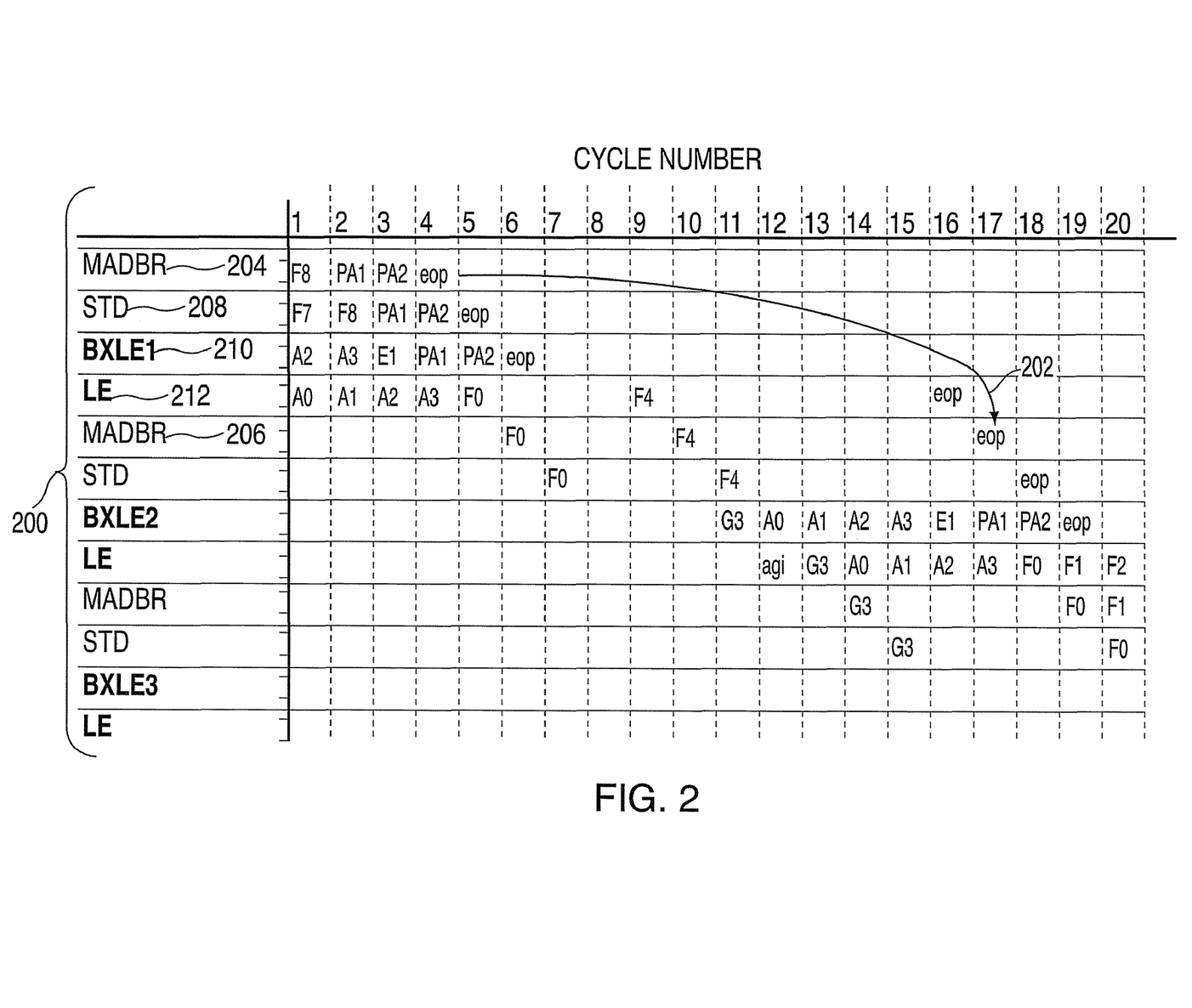
FIG. 2 depicts a timing diagram of an instruction sequence without overlapping execution of instructions.
Figure 3:
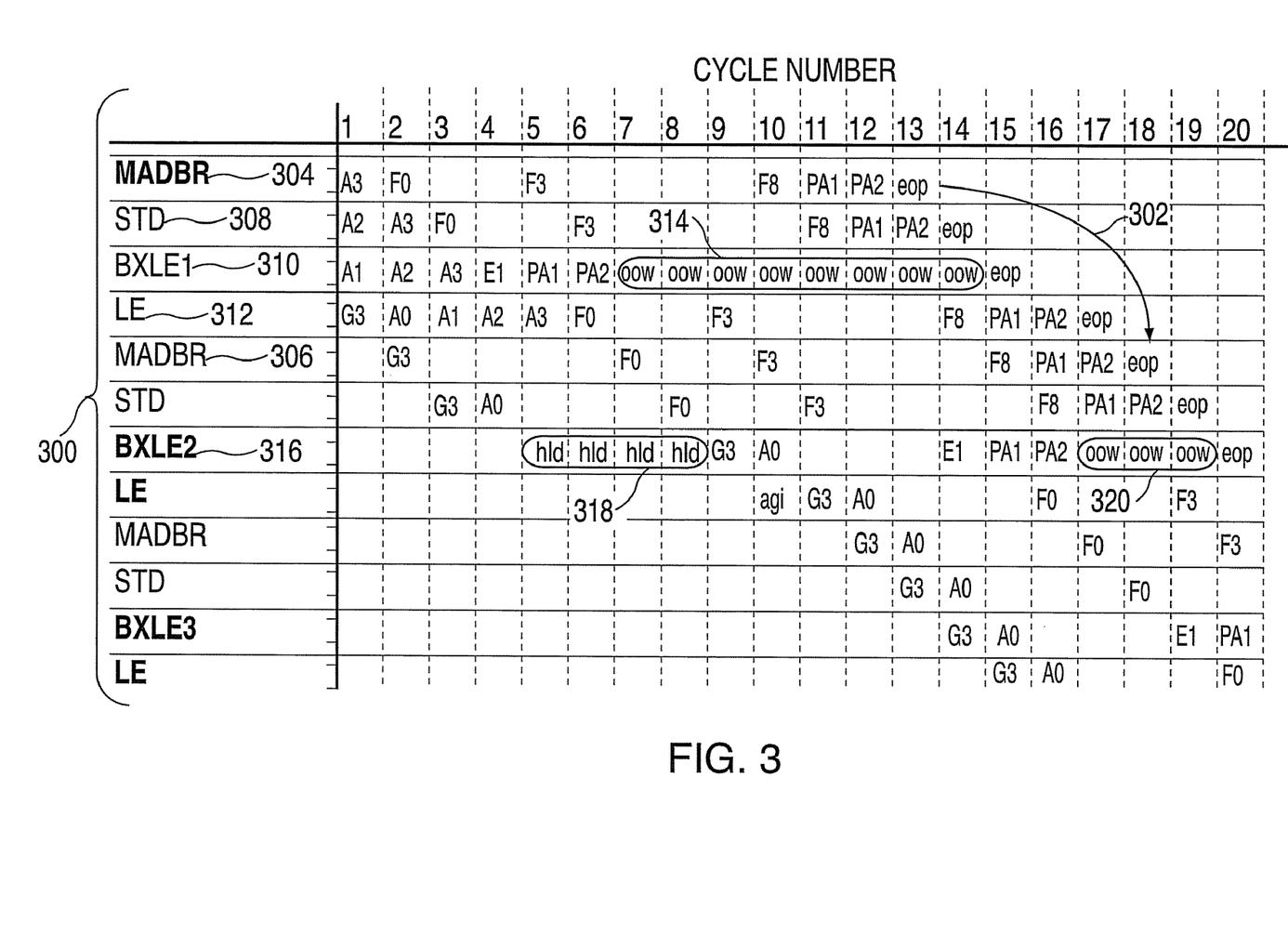
FIG. 3 depicts a timing diagram of an instruction sequence with overlapping execution of fixed-point and floating-point instructions.

FIG. 2 depicts an example of a sequence of instructions 200 including a floating-point loop in a pipeline without out-of-order execution. FIG. 3 depicts a sequence of instructions 300 that is equivalent to the sequence of instructions 200 of FIG. 2; however, the sequence of instructions 300 is performed using the system 100 to perform out-of-order execution. Comparing FIG. 2 to FIG. 3, it will be apparent that arrow 202 spans thirteen cycles between end of operations (eops) for multiply and add instruction (MADBR) 204 to MADBR 206 as compared to arrow 302 indicating only five cycles between eops of MADBR 304 to MADBR 306. An eop indicates that an instruction has retired. Both instruction sequences 200 and 300 include the same instructions; however, using the system 100 of FIG. 1, a fixed-point instruction no longer needs to wait until a preceding floating-point instruction is sufficiently deep in the FPU 114 before dispatching. Similarly, subsequent floating-point instructions no longer have to wait for a fixed-point instruction to execute before dispatching.

The instruction sequence 200 of FIG. 2 includes floating-point instructions multiple and add (MADBR) 204 and store (STD) 208, followed by fixed-point instruction branch on index (BXLE) 210, and then floating point instructions load (LE) 212 and MADBR 206. In order for eops of each instruction in the instruction sequence 200 to remain in order, dispatch (G3-success) of the BXLE 210 is delayed such that BXLE 210 is in execute stage (E1) (e.g., in FXU zero 112) after STD 208 completes stage F8 (e.g., FPU stage N 122). Cycles A0, A1, A2, A3 indicate required pipeline delays, whether necessary or not, to access cache data from LSU zero 108 or LSU one 110 before execution occurs. Here F8 indicates the eighth and final FPU stage of executing the STD 208, while E1 is a single stage fixed-point execution. Delaying the dispatch of the BXLE 210, results in a delay of dispatching the LE 212. In the example depicted in FIG. 2, BXLE 210 is address generation interlocked (AGI'd) against the LE 212. The instruction sequence 300 of FIG. 3 includes floating-point instructions MADBR 304 and STD 308, followed by fixed-point instruction BXLE 310, and then floating point instructions LE 312 and MADBR 306. In FIG. 3, the BXLE 310 is in stage E1 after the first floating-point execution cycle (F0) of STD 308. Thus, using the OE registers and logic 106 of FIG. 1, the BXLE 310 dispatches eight cycles earlier as compared to BXLE 210 of FIG. 2. The LE 312, which is AGI'd against BXLE 310, starts execution at F0 with no additional delays beyond that depicted between BXLE 210 and LE 212 of FIG. 2. To maintain in-order retirement (eops), wait (oow) 314 cycles are inserted after put away cycles (PA1, PA2) and before eop for the BXLE 310. During the oow 314 period, the results of the fixed-point execution of the BXLE 310 are held in a latch (e.g., latch 132 and/or latch 140 of FIG. 1). The OE registers and logic 106 of FIG. 1 controls the number oow 314 cycles such that in-order retirement is maintained for the instruction sequence 300.

If a second fixed point instruction is encountered in the instruction sequence 300 while waiting is active, the second instruction can be held off at dispatch (e.g., at the IDU 104 of FIG. 1) until there is capacity to execute and hold the second fixed-point instruction. An example of this is depicted at BXLE 316, which is ready for dispatch in cycle number 5 of FIG. 3. Since BXLE 310 is occupying resources needed to dispatch and execute BXLE 316, BXLE 316 is held in hold 318 cycles, where G3 represents actual dispatching. Holding BXLE 316 prior to dispatching reduces the number of oow 320 cycles that are inserted between PA2 and eop for BXLE 316, and maintains retirement order for the instruction sequence 300.

Figure 4:
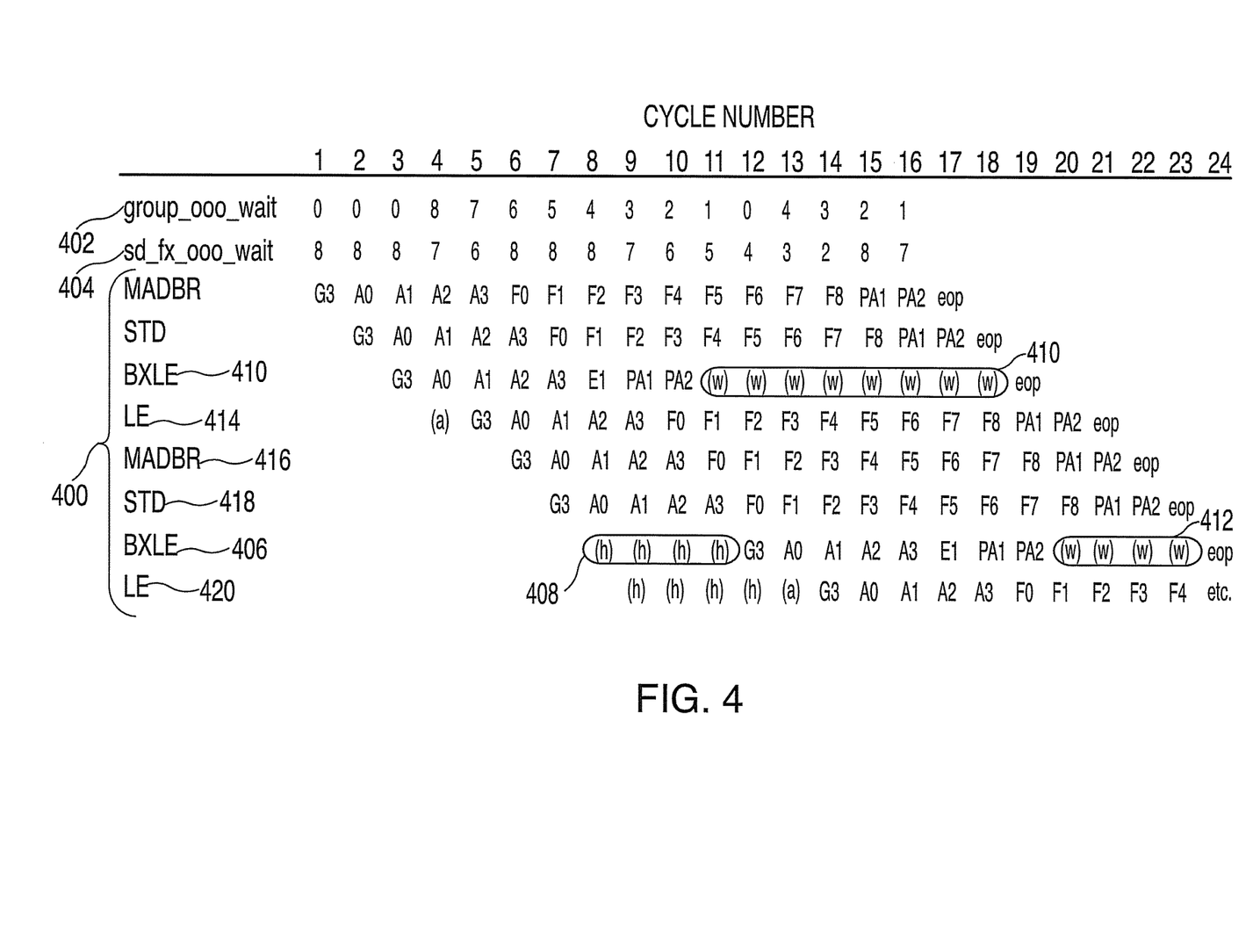
FIG. 4 depicts exemplary counters to support overlapping execution of instructions through non-uniform execution pipelines.

FIG. 4 depicts an instruction sequence 400 that represents a subset of the instruction sequence 300 of FIG. 3. Two counters, group_ooo_wait 402 and sd_fx_ooo_wait 404, are also depicted in FIG. 4. In an exemplary embodiment, group_ooo_wait 402 and sd_fx_ooo_wait 404 are counters in the OE registers and logic 106 of FIG. 1. The example depicted in FIG. 4 includes an FPU with a depth of eight (e.g., FPU 114 of FIG. 1 with eight FPU stages). Group_ooo_wait 402 holds the number of cycles that the IDU 104 of FIG. 1 waits before dispatching a group of OE-capable instructions (i.e., an ooo-group). As previously described in reference to the BXLEs 310 and 316 of FIG. 3, waiting ensures that a second ooo-group does not interfere with a first ooo-group. For example, BXLE 406 must wait for four cycles starting at cycle number 8, indicated as hold 408 cycles before dispatch G3 of the BXLE 406. Here, the BXLE 406 is the second ooo-group relative to the first ooo-group, BXLE 410.

The sd_fx_ooo_wait 404 is the retirement delay required of the currently dispatching ooo-group. For example, when BXLE 410 dispatches (G3) at cycle number 3, the sd_fx_ooo_wait 404 is set to a value of eight, indicating that eight wait (w or oow) 410 cycles will be inserted before eop. Similarly, when BXLE 406 dispatches (G3) at cycle number 12, the sd_fx_ooo_wait 404 is set to a value of four, indicating that four wait (w or oow) 412 cycles will be inserted before eop. When a pipelinable FPU instruction dispatches, the sd_fx_ooo_wait 404 is reset to the depth of the FPU 114 of FIG. 1 and decrements every cycle thereafter. For example, dispatch of LE 414 in cycle number 3 resets the sd_fx_ooo_wait 404 to eight in cycle number 4. Since the subsequent instructions MADBR 416 and STD 418 are both floating-point instructions, the sd_fx_ooo_wait 404 remains at a value of eight until cycle number 9, where it decrements unit LE 420 dispatches in cycle number 14.

If an ooo-group is in G3 and the group_ooo_wait 402 has a value of zero, the ooo-group is permitted to dispatch and must wait the number of cycles in sd_fx_ooo_wait 404 between PA2 and eop. If the ooo-group is in G3 and group_ooo_wait 404 is non-zero, dispatch is stalled and both counters group_ooo_wait 402 and sd_fx_ooo_wait 404 decrement. If either counter is non-zero, in-order FXU groups may not dispatch. Therefore, no instruction IDs are required to manage out-of-order execution, which may be required in ooo-μPs.

In an exemplary embodiment, in-order branch resolution is managed and handled, even if an OE branch resolves incorrectly. A consistent view is maintained in the system 100 of FIG. 1 as to whether a wrong branch or a correct branch is executed. Recovery path information can be restored after the wrong branch is signaled. The FXU zero 112 or one 134 can signal the IDU 104 that an OE-branch has resolved wrong (OE-branch wrong), and should stop ingating new instructions from the IFU/I-cache 102. Signaling of a successful decode to the FXU zero 112 or one 134 can be stopped until the OE-branch wrong is resolved. The IFU/I-cache 102 gets a jump on fetching down the correct (recovery) path early after the OE-branch wrong as compared to in-order execution. For consistency, the IFU/I-cache 102 does not present OE-branch-wrong-recovery instructions to the IDU 104 until after the IDU 104 has acted upon the delayed (in-order) branch wrong. This hides some or all of the restart latency under an OE-branch wrong at the front-end of the system 100.

Figure 5:
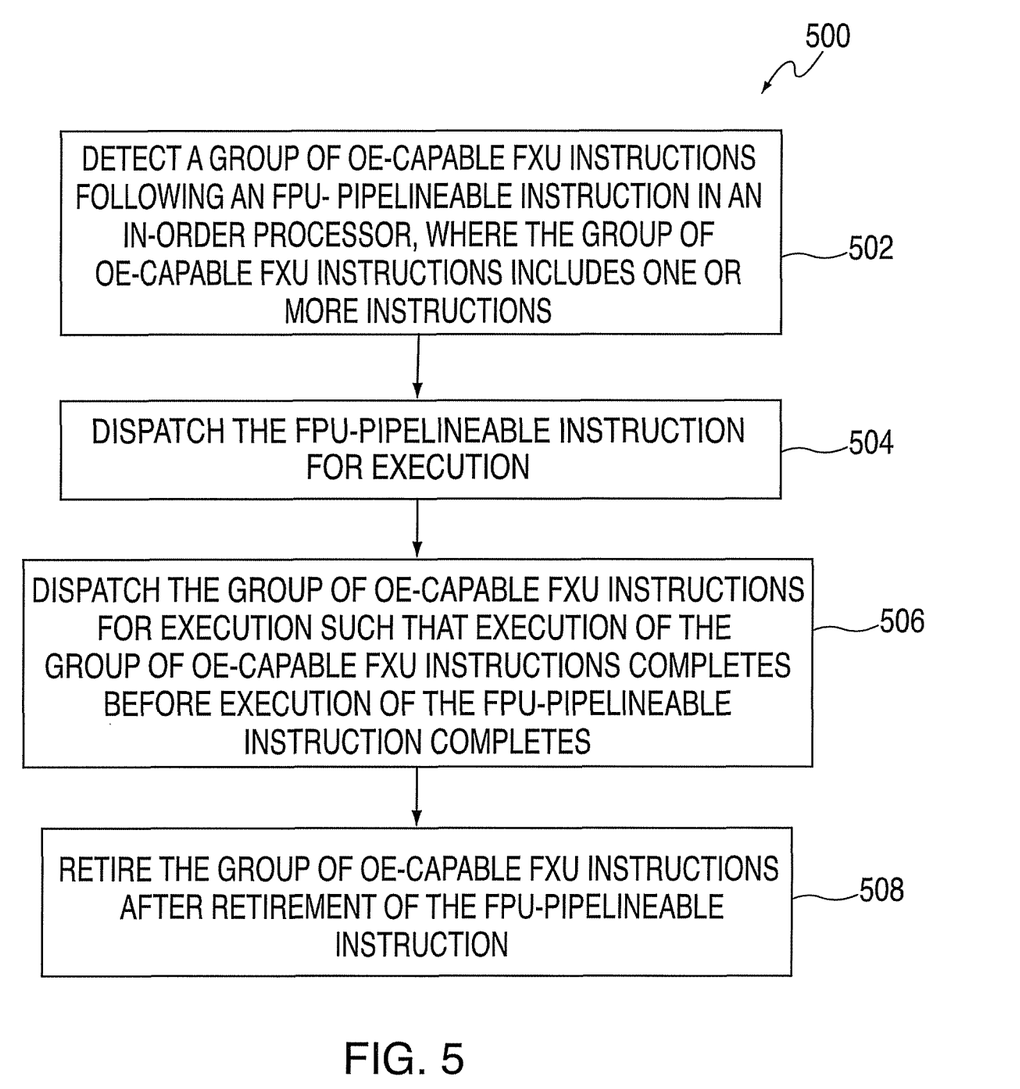
FIG. 5 depicts a process for performing overlapping execution of instructions through non-uniform execution pipelines in an in-order processor in accordance with an exemplary embodiment.

Turning now to FIG. 5, a process 500 for overlapping execution of instructions through non-uniform execution pipelines in an in-order processor will now be described in reference to the system 100 of FIG. 1 and in accordance with exemplary embodiments. The IDU 104 can receive FPU-pipelineable instructions (e.g., floating-point instructions) and OE-capable FXU instructions (e.g., fixed-point/branch instructions) from the IFU/I-cache 102. The FXU zero 112 is one example of a first execution unit to perform instruction execution in a first execution pipeline in the system 100. The FPU 114 is an example of a second execution unit to perform instruction execution in a second execution pipeline in the system 100, where the second execution pipeline includes a greater number of stages than the first execution pipeline (e.g., multiple stages of the FPU 114 as compared to the single stage of the FXU zero 112). The FXU one 134 is an example of a third execution unit to support grouping of multiple instructions with respect to the first execution unit (FXU zero 112) and perform OE with the second execution unit (FPU 114).

At block 502, the IDU 104 detects a group of OE-capable FXU instructions following an FPU-pipelineable instruction. The group of OE instructions includes one or more instructions that can be performed in parallel, e.g., in FXU zero 112 and FXU one 134. OE registers and logic 106 can perform various waiting time calculations which are used to control wait/hold times before instruction execution and after instruction execution. For example, the OE registers and logic 106 calculates a number of cycles to wait (e.g., sd_fx_ooo_wait 404) after the execution of the group of OE-capable FXU instructions until retirement of the group of OE-capable FXU instructions. The OE registers and logic 106 can also calculate a number of cycles until execution of the FPU-pipelineable instruction is complete as a wait count (e.g., group_ooo_wait 402), which is used to prevent a second group of OE-capable FXU instructions from executing when the wait count is greater than zero.

At block 504, the IDU 104 dispatches the FPU-pipelineable instruction for execution. Execution of the FPU-pipelineable instruction in the FPU 114 can take multiple cycles, as execution progresses through FPU stage one 116 to FPU stage N 122.

At block 506, the IDU 104 dispatches the group of OE-capable FXU instructions for execution such that execution of the group of OE-capable FXU instructions completes before execution of the FPU-pipelineable instruction completes. When the group of OE-capable FXU instructions completes execution, the results can be held in latches (e.g., latches 132 and 140) while waiting for the FPU-pipelineable instruction to complete execution and retire.

At block 508, the OE registers and logic 106 can control timing for retiring the group of OE-capable FXU instructions after retirement of the FPU-pipelineable instruction. The timing can include waiting based on the wait times previously calculated.

Technical effects and benefits include providing instruction-issue bandwidth improvement on an otherwise in-order μP for floating-point-intensive workloads containing tight loops. By reducing dispatch delays associated with waiting for a floating-point instruction to advance far enough through an FPU pipeline ensures that a subsequent fixed-point instruction is retired after the floating-point instruction, and allows subsequent floating-point instruction dispatches to proceed earlier. A pair of counter registers can establish wait and hold times for fixed-point instruction execution to ensure that proper in-order retirement of instructions is maintained. Repeated iterations of a loop quickly results in optimal branch prediction accuracy of the loop, and in turn optimal OE gains within the loop.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A system for overlapping execution (OE) of instructions through non-uniform execution pipelines in an in-order processor, the system comprising:
   a first execution unit to perform instruction execution in a first execution pipeline;
   a second execution unit to perform instruction execution in a second execution pipeline, wherein the second execution pipeline includes a greater number of stages than the first execution pipeline;
   an instruction dispatch unit (IDU), the IDU including OE registers and logic for dispatching an OE-capable instruction to the first execution unit such that the instruction completes execution prior to completing execution of a previously dispatched instruction to the second execution unit; and
   a latch to hold a result of the execution of the OE-capable instruction until after the second execution unit completes the execution of the previously dispatched instruction.

2. The system of claim 1 wherein the OE registers and logic determine a waiting period to hold the result of the execution of the OE-capable instruction in the latch until after the second execution unit completes the execution of the previously dispatched instruction.

3. The system of claim 1 wherein the first execution unit is a fixed-point execution unit (FXU) or a branch resolution unit (BRU), and the second execution unit is a floating-point execution unit (FPU).

4. The system of claim 1 wherein the OE registers and logic include a wait counter that establishes a holding time to hold a subsequent instruction prior to dispatching the subsequent instruction.

5. The system of claim 1 wherein the OE registers and logic include a wait counter that establishes a waiting time to hold a result of the execution of the OE-capable instruction in the latch.

6. The system of claim 1 further comprising:
a third execution unit to support grouping of multiple instructions with respect to the first execution unit and perform OE with the second execution unit; and
a second latch to hold a result of the execution of a second OE-capable instruction using the third execution unit until after the second execution unit completes the execution of the previously dispatched instruction.

7. The system of claim 1 wherein the IDU dispatches a subsequent instruction to the second execution unit following the OE-capable instruction prior to the first execution unit completing execution.

8. The system of claim 1 wherein the first execution unit determines that an OE-branch resolved incorrectly and signals the IDU and an instruction fetching unit (IFU) such that the IFU can start fetching down a recovery path early as compared to in-order execution of the previously dispatched instruction and the OE-capable instruction.

9. A method for overlapping instruction execution in an in-order processor, the method comprising:
detecting a group of overlapping execution (OE)-capable instructions following a pipelineable instruction in the in-order processor, wherein the group of OE-capable instructions includes one or more instructions;
dispatching the pipelineable instruction for execution;
dispatching the group of OE-capable instructions for execution such that execution of the group of OE-capable instructions completes before execution of the pipelineable instruction completes; and
retiring the group of OE-capable instructions after retirement of the pipelineable instruction.

10. The method of claim 9 wherein the group of OE-capable instructions is a group of fixed-point instructions, and the pipelineable instruction is a floating-point instruction.

11. The method of claim 9 wherein the pipelineable instruction is executed in a multi-stage execution unit, and the group of OE-capable instructions are executed in one or more single-stage execution units.

12. The method of claim 9 further comprising:
calculating a number of cycles to wait after the execution of the group of OE-capable instructions until retirement of the group of OE-capable instructions; and
holding the results of the execution of the group of OE-capable instructions in a latch until the calculated number of cycles elapses.

13. The method of claim 9 further comprising:
calculating a number of cycles until execution of the pipelineable instruction is complete as a wait count; and
preventing a second group of OE-capable instructions from executing when the wait count is greater than zero.

14. The method of claim 9 wherein the execution of the group of OE-capable instructions does not modify a condition code state in the in-order processor upon which the pipelineable instruction relies.

15. The method of claim 9 further comprising:
dispatching a subsequent FPU-pipelineable instruction prior to completing the execution of the group of OE-capable instructions.

16. The method of claim 9 further comprising:
determining that an OE-branch resolved incorrectly; and
fetching down a recovery path early as compared to in-order execution of the FPU-pipelineable instruction and the group of OE-capable instructions.

17. A system for overlapping fixed-point and floating-point instruction execution in an in-order processor, the system comprising:
a fixed-point execution unit (FXU) to perform fixed-point instruction execution, including branch instructions;
a floating-point execution unit (FPU) to perform floating-point instruction execution, wherein the FPU includes multiple stages;
an instruction dispatch unit (IDU), the IDU including overlapping execution registers and logic for dispatching a fixed-point instruction to the FXU such that the fixed-point instruction completes execution prior to completing execution of a previously dispatched floating-point instruction; and
a latch to hold a result of the execution of the fixed-point instruction until after the FPU completes the execution of the previously dispatched floating-point instruction.

18. The system of claim 17 wherein the overlapping execution registers and logic determine a waiting period to hold the result of the execution of the fixed-point instruction in the latch until after the FPU completes the execution of the previously dispatched floating-point instruction.

19. The system of claim 17 wherein the overlapping execution registers and logic include:
a first wait counter that establishes a holding time to hold a subsequent fixed-point instruction prior to dispatching the subsequent fixed-point instruction; and
a second wait counter that establishes a waiting time to hold a result of the execution of the fixed-point instruction in the latch.

20. The system of claim 17 wherein the FXU determines that a branch instruction resolved incorrectly and signals the IDU and an instruction fetching unit (IFU) such that the IFU can start fetching down a recovery path early as compared to in-order execution of the previously dispatched floating-point instruction and the fixed-point instruction.

21. The system of claim 1 wherein the OE registers and logic include a first wait counter and a second wait counter, the first wait counter establishing a holding time to hold a subsequent instruction prior to dispatching the subsequent instruction and the second wait counter establishing a waiting time to hold a result of the execution of the OE-capable instruction in the latch.

22. The method of claim 9 further comprising:
calculating a number of cycles to wait after the execution of the group of OE-capable instructions until retirement of the group of OE-capable instructions;
holding the results of the execution of the group of OE-capable instructions in a latch until the calculated number of cycles elapses;
calculating a number of cycles until execution of the pipelineable instruction is complete as a wait count; and
preventing a second group of OE-capable instructions from executing when the wait count is greater than zero.

* * * * *